(12) United States Patent
Angelici et al.

(10) Patent No.: US 10,035,066 B2
(45) Date of Patent: Jul. 31, 2018

(54) INTERACTIVE ENTERTAINMENT ELECTRONIC SYSTEM

(71) Applicant: STMICROELECTRONICS S.R.L., Agrate Brianza (IT)

(72) Inventors: Marco Angelici, Galliate Lombardo (IT); Andrea Mario Onetti, Besana Brianza (IT)

(73) Assignee: STMICROELECTRONICS S.R.L., Agrate Brianza (MI) (IT)

( * ) Notice: Subject to any disclaimer, the term of this patent is extended or adjusted under 35 U.S.C. 154(b) by 454 days.

(21) Appl. No.: 14/643,659

(22) Filed: Mar. 10, 2015

(65) Prior Publication Data

US 2015/0182858 A1 Jul. 2, 2015

Related U.S. Application Data

(63) Continuation of application No. 11/969,474, filed on Jan. 4, 2008, now Pat. No. 8,974,300.

(30) Foreign Application Priority Data

Jan. 5, 2007 (IT) .............................. MI2007A0009

(51) Int. Cl.
| | |
|---|---|
| *A63F 13/428* | (2014.01) |
| *A63F 13/54* | (2014.01) |
| *A63F 13/211* | (2014.01) |
| *A63F 13/235* | (2014.01) |
| *A63F 13/28* | (2014.01) |
| *A63F 13/216* | (2014.01) |

(52) U.S. Cl.
CPC ............ *A63F 13/54* (2014.09); *A63F 13/211* (2014.09); *A63F 13/235* (2014.09); *A63F 13/28* (2014.09); *A63F 13/216* (2014.09); *A63F 2300/105* (2013.01); *A63F 2300/1031* (2013.01); *A63F 2300/6081* (2013.01); *Y10T 29/49002* (2015.01)

(58) Field of Classification Search
CPC ........................................................ H04S 7/304
USPC .............................................. 463/1–6, 37–47
See application file for complete search history.

(56) References Cited

U.S. PATENT DOCUMENTS

| | | | |
|---|---|---|---|
| 5,729,175 A | 3/1998 | Ferrer | |
| 6,445,364 B2 * | 9/2002 | Zwern | G09B 9/00 345/156 |
| 6,593,806 B1 | 7/2003 | Melanson | |
| 7,408,403 B2 | 8/2008 | Farrar et al. | |
| 2002/0150256 A1 | 10/2002 | Belrose et al. | |

(Continued)

OTHER PUBLICATIONS

Joffrion et al., "Head tracking for using a GPS-aided 3D audio MEMS IMU", Air Force Research Laboratory, Air Force Institute of Technology, Wright-Patterson AFB, Ohio, Feb. 2006, pp. 1-12.

(Continued)

*Primary Examiner* — David L Lewis
*Assistant Examiner* — Ross Williams
(74) *Attorney, Agent, or Firm* — Slater Matsil, LLP

(57) ABSTRACT

The present invention relates to a remote play device for an interactive entertainment system and may include a class D amplifier and at least one motion detection device. The remote play device may also include a processor to adapt sound effects played through the class D amplifier based upon the at least one motion detection device. A battery may also be included powering at least the class D amplifier.

21 Claims, 3 Drawing Sheets

(56) References Cited

U.S. PATENT DOCUMENTS

| | | | |
|---|---|---|---|
| 2003/0031334 A1* | 2/2003 | Layton | H04R 27/00 381/310 |
| 2005/0088120 A1 | 4/2005 | Avis | |
| 2006/0056639 A1* | 3/2006 | Ballas | H04S 1/005 381/17 |
| 2006/0238877 A1 | 10/2006 | Ashkenazi et al. | |

OTHER PUBLICATIONS

Lokkie et al., "Application scenarios of wearable and mobile augmented reality audio", Audio Engineering Society, paper 6026, May 2004, pp. 1-9.

Putzeys, "Digital audio's final frontier", Spectrum, IEEE, vol. 40, No. 3, Mar. 2003, pp. 34-41.

Satoh et al., "A head tracking method using bird's-eye view camera and gyroscope", Proceedings of the Third IEEE and ACM International Symposium on mixed and augmented reality, IEEE, 2004, pp. 1-10.

\* cited by examiner

INTERACTIVE ENTERTAINMENT ELECTRONIC SYSTEM

FIELD OF THE INVENTION

The present invention relates to an interactive entertainment electronic system comprising a remote gaming device.

BACKGROUND OF THE INVENTION

As it is known in this specific technical field, interactive entertainment electronic systems are becoming more and more popular. For example there already exist examples of interactive television where a user can send back to the transmission network a piece of information in real time with a TV show, although staying at home.

More particularly, in the field of the play stations most of the play applications are based on a main play station, for example a personal computer or a so called Game Box. A multimedia processor is incorporated inside this main station for managing, through software, all the multimedia effects.

Then, all the remote cabled elements such as for example: headsets, play devices, the control handles and other components are connected to the main station as play accessories. The remote elements send simple control signals (of position or of action or of play movement) to the main station for being processed by the multimedia processor of the main station.

The known and mature wireless technologies such as Bluetooth or Wireless Local Area Networks already allow the possibility to deal wirelessly with the above remote accessories, such as the play device, the remote controls, or the wireless headsets, thus offering a user the freedom of moving while playing music or playing.

However, so far no interactive entertainment electronic systems have been devised that are able to adapt the multimedia effects both processed in the main station and locally in the play device, with return signals coming from the user the system.

SUMMARY OF THE INVENTION

A purpose of the present invention is that of addressing the problem associated with the prior art approaches and providing an interactive entertainment electronic system to adapt the multimedia effects (sound, video, graphical or mechanical effects such as vibrations) according to the position or the motion detection of a remote user both in the main station and in the play device.

Other purposes may be attained by providing changes of the multimedia effects according to the user's location in a room or according to his movement modes.

An embodiment of the invention relates to a remote play device for an interactive entertainment system, the remote system may include a class D amplifier, and at least one motion detection device. A processor to adapt sound effects played through the class D amplifier based upon the at least one motion detection device may be included. A battery for powering at least the class D amplifier may also be included.

Another embodiment of the invention relates to a method for making a remote play device for an interactive entertainment electronic system.

BRIEF DESCRIPTION OF THE DRAWINGS

The characteristics and the advantages of the remote play device for an interactive entertainment electronic system according to the invention will be apparent from the following description of an embodiment given by way of indicative and non limiting example with reference to the annexed drawings.

DETAILED DESCRIPTION OF THE PREFERRED EMBODIMENTS

Figure 1:
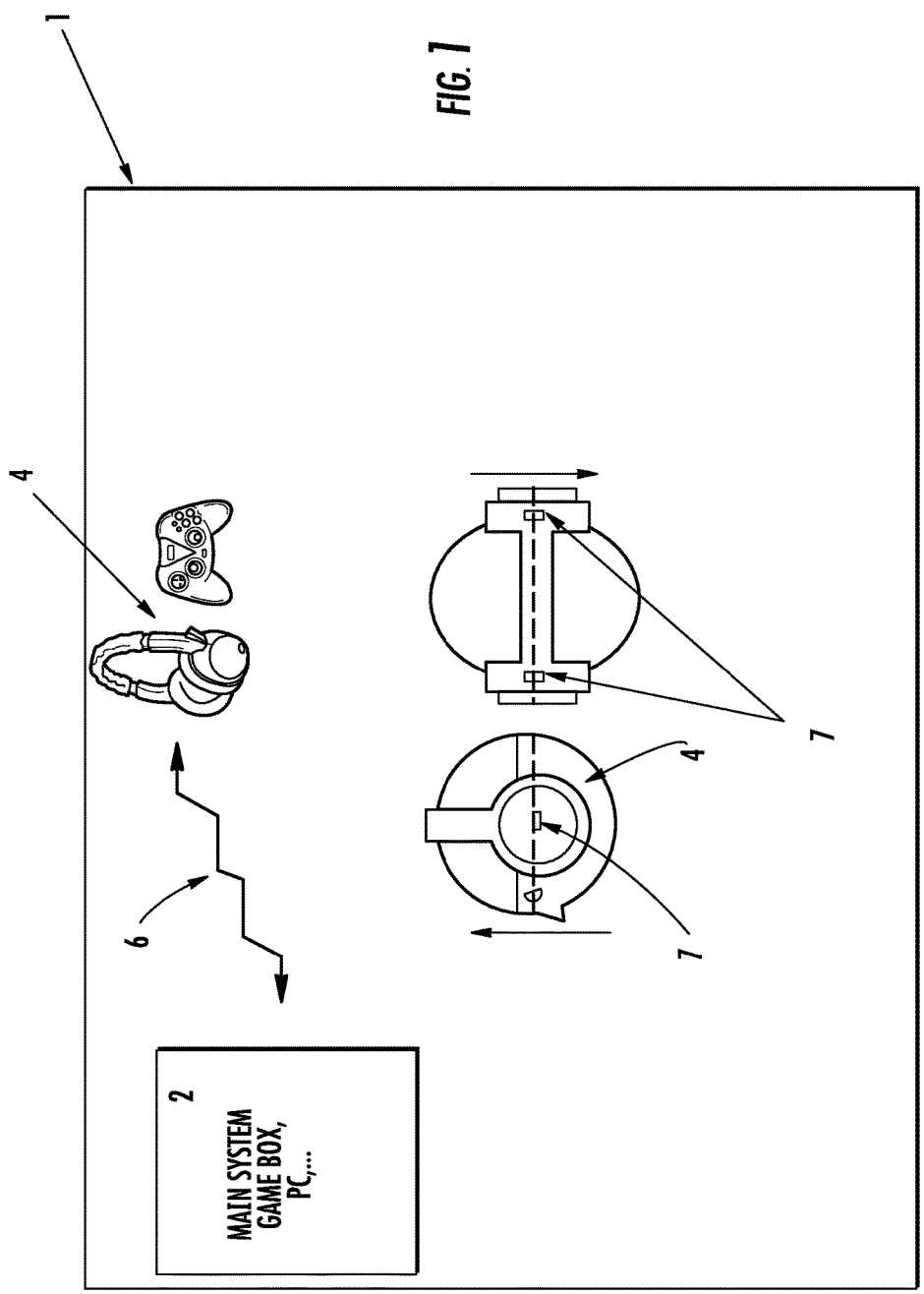
FIG. 1 shows a schematic view of an interactive entertainment electronic system according to the invention.

With reference to the figures of the drawings, in FIG. 1, 1 globally and schematically shows an interactive entertainment electronic system 1 comprising a main station 2 and a remote play device 4 incorporating a motion detection device 7.

The play device 4, is wireless and is supplied through a battery, and can be for example, a wireless headset, or a play helmet.

A wireless connection is indicated with 6 between the remote play device 4 and a main station or at least another wireless play device. This wireless connection 6 can be implemented for example through a Bluetooth connection or a wireless local network.

The main station is based on a powerful multimedia processor, not shown, since it is a conventional (normally there are no problems of power consumption and of software complexity since the main station is supplied by a supply line AC).

The main station 2 is normally intended as a unit structurally independent from the remote and wireless play device 4; however, according to an aspect of some embodiments, the play device 4 can operate without a main station 1 and can be considered as incorporating the station having on board a low consumption multimedia or sound processor 3.

Figure 2:
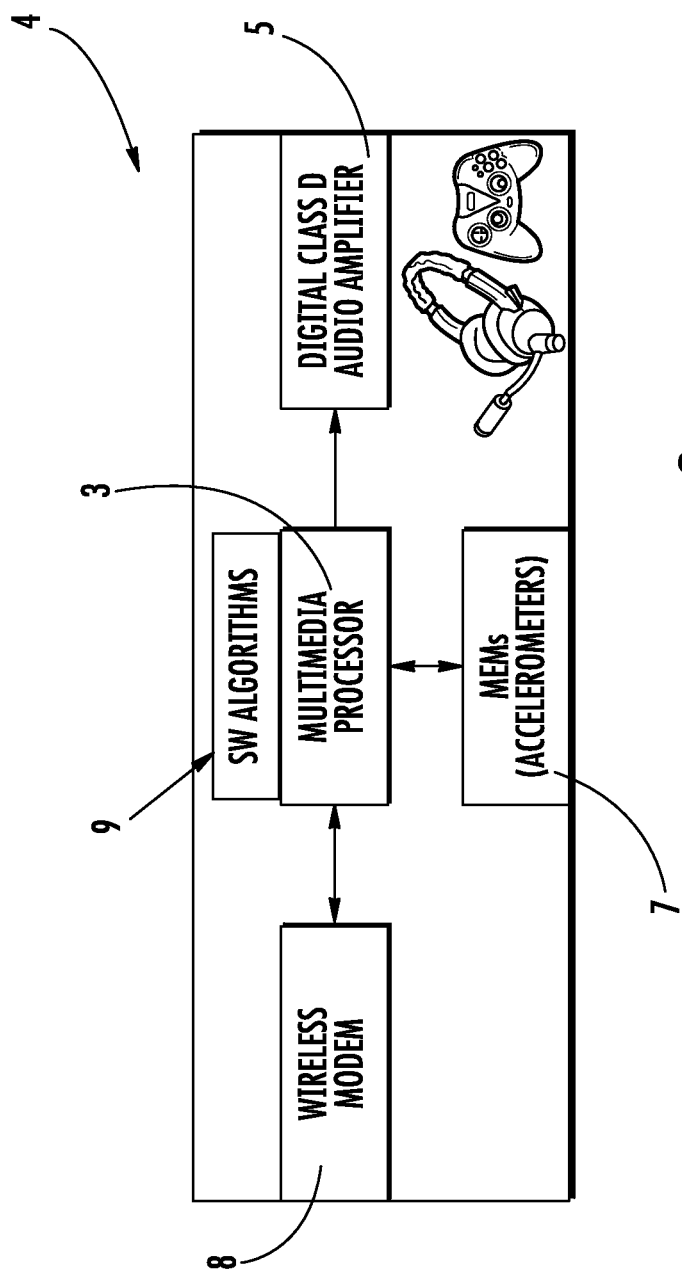
FIG. 2 shows another schematic view, in greater detail of a remote play device according to the invention.

In FIG. 2, 4 shown the interactive remote play device of the wireless type 4 shown comprising a sound or multimedia processor 3 and sound or multimedia software algorithms 9 associated with the processor 3 and able to modify the multimedia effects according to return signals received through the motion detection device 7.

The interactive wireless play device 4 also includes a wireless modem 8 for establishing a wireless connection with the main station 2 and a digital class D amplifier 5 which provides power audio amplification with low power consumption and makes superfluous the use of a digital analog converter. This is a significant advantage for portable play devices whose power is supplied through a battery.

The extra power consumption saved by the digital class D amplifier 5 is used for increasing the complexity of the software of the multimedia processor 3 incorporated in the play device adding the multimedia adaptation effects as a consequence of movement detection.

The system with the motion detection device 7 is incorporated into the play device 4. For example, the motion detection device 7 can include at least one linear accelerometer of the MEMS type (Micro Electro Mechanical Systems), and preferably at least two accelerometers.

Alternatively, this motion detection device 7 can include a global Positioning System device (GPS) or a gyroscope.

As a further alternative, this motion detection device 7 can include a localization system in real time.

For a complete description it is to be noted that audio amplifiers are conventionally classified and the different classes are designated with letters: A, B, AB, C, and D. Analog audio class D amplifiers have been used for several years in systems, like wireless telephony, wherein a wide band is not critical but the power consumption is instead critical.

New manufacturing techniques have made possible the integration of power transistors for realizing digital class D amplifiers. This has extended their potential of application to the low power and wider band systems, wireless communication systems, and sound players supplied through a battery.

The digital class D amplifier 5 is an integrated audio amplifier which supplies a loudspeaker digital signal processor (DSP) with a completely digital modulation. This is particularly suitable for multimedia applications (wherein there is no need of analog-to-digital conversion), and allows a user to listen to music or sounds with high efficiency ensuring a longer duration of the supply batteries of the audio system.

One of the greater advantages of the class D amplifiers is their efficiency. This increased efficiency of the class D amplifiers reduces the power consumption and as a consequence decreases the heat dissipation and increases the duration of the batteries in portable systems.

The digital class D amplifiers integrated in a single chip have increased the efficiency as compared with the analog class D amplifiers. The class D amplifiers for portable devices used in some embodiments do not require any output filter, which is instead required by the normal class D amplifiers. A digital class D amplifier 5 is advantageously incorporated in the wireless play device 4 supplied through a battery.

According to the combination of previously described characteristics, the electronic device 1 is able to adapt the multimedia effects according to feedback signals received through the motion detection device 7.

As previously discussed, an embodiment of this interactive system could be a wireless headset 4 incorporating position detection elements 7 (accelerometers, GPS, MEMS Gyroscopes, localization systems in real time) able to adapt the sound effects according to the position of the head or the user's movement.

The extra power consumption required by the processor for adapting the multimedia or sound effects is saved by the digital class D amplifier 5 which preserves the desired long battery duration.

A possible application is a play station 11 wherein the user reacts to the play stimuli moving himself (or moving the head) and the sound or video effects of the game are adapted to this change of position or movement.

The wireless technology, such as for example Bluetooth or wireless local network, offers the possibility to deal with remote apparatuses of the interactive system of FIG. 1 (such as play device, remote controls or wireless headsets) offering the user the freedom of moving while playing or listening to music.

Therefore the play devices 4 incorporate the motion detection device 7 and the movement information and are processed locally by the multimedia processor 3 for adapting the sound and in parallel send them to the main station 2 for being processed by a main multimedia processor, for example, for adapting the video effects or other effects in the main station.

As already said the main station can be replaced by another remote and wireless play device which can adapt its own sound according to the movements of the first play device for offering a full interactivity between two or more different players.

The software algorithms 9 processed in the multimedia processor 3 consume power from the battery and this power may be the most important resource to be preserved in wireless accessories for maintaining the functionality for the whole duration of the game or of the video.

According to one advantage, the presence of the high efficiency digital class D amplifier 5 in the wireless play device 4 supplied through battery addresses the problem of the method for increasing the duration of the battery.

The digital class D amplifier allows a user to listen to music or sounds with high efficiency ensuring an extended battery duration in audio systems.

Also, the other components of the interactive entertainment system 1 are provided with the purpose of saving energy, such as the motion detection device, which may be realized with two linear accelerometers, the low consumption sound processor and the wireless connections, and are designed for consuming the bare minimum for the operation of the interactive entertainment system 1.

All the above elements can be structurally independent devices or integrated in a single application specific integrated circuit (ASIC) or in a system on a package.

Advantageously, the use of the MEMS for realizing the linear accelerometers allows to provide a more accurate motion detection. The diaphragm of the accelerometer can be realized with a single semiconductor chip using MEMS (Micro Electro Mechanical Systems) with a manufacturing process with CMOS semiconductors.

The energy saving, mainly obtained with the use of the digital class D amplifier 5, is exploited for carrying out extra operations (MIPS) inside the multimedia processor 3 in the play device or in the headset so that the sound or any other multimedia effect can be modified directly inside the headset or the helmet according to the motion detection obtained through the MEMS devices.

Figure 3:
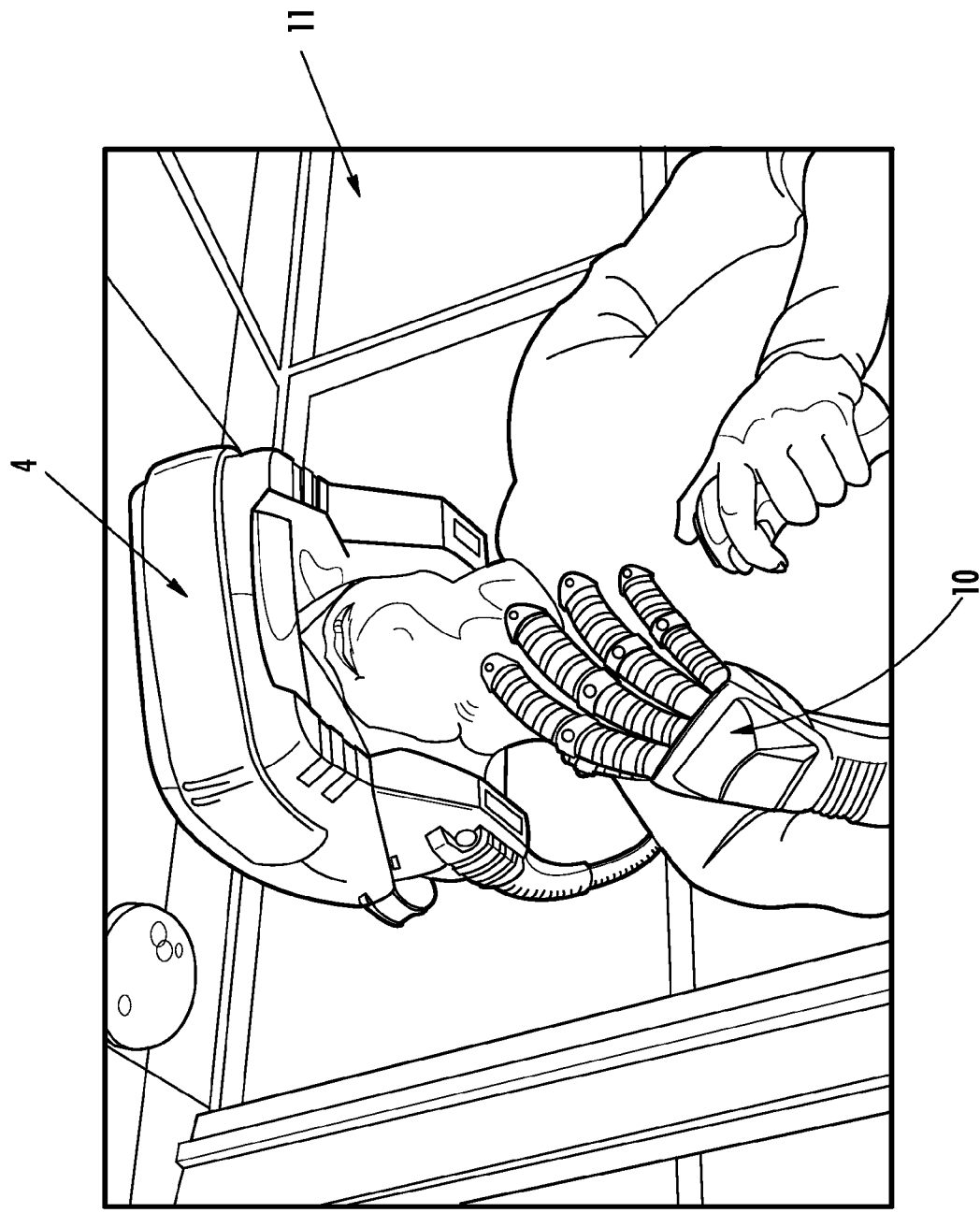
FIG. 3 shows an embodiment wherein two remote play devices, a helmet for virtual reality and a glove, interact with each other according to the invention.

A possible application of the interactive entertainment system 1 is shown in FIG. 3 and is exemplified by the play helmets wherein the music and the images of the visual screen which covers the eyes are locally managed in the helmet for creating virtual realities.

Virtual reality may be the most appropriate example in which audio and video signals can be adapted to the movement of the head or of the hands, for example, in the case in which a glove 10 can be the moving element or remote play device instead of the helmet.

Also, a combination of moving elements, and helmet, can be used for creating, in the user, the sensation of being in the center of an action scene or of being the hero of a film set.

The wireless connection also has the important function of maintaining the user's full freedom of movement sending audio signals from the main station 2, or from another play device 4; to the remote headset and receiving return signals through a return channel and relevant to the movement information for the main station. The result of the processing of the return signals allows for example to adapt the video images to the user's movements.

According to another advantage the same return signals can be sent to other users of the game, for example, equipped with similar helmets or headsets for a complete game interaction or, alternatively, the movement information can be sent by the gloves to the audio/video helmet.

The embodiments disclosed herein offer several advantages, for example:

with two linear accelerometers the movements of the head can be measured with great accuracy and two additional functions can be added to the conventional wireless helmets;

the position, inclination and rotation of the head defines an audio dependent virtual space;

the multimedia processor can be programmed so that there is a self turn-off when no movement is detected for long periods, thus saving further battery duration; and the MEMS elements in the play device can be used for several purposes:

changing the effects (audio/video/graphical) according to the user's movements, turning off the remote play device when no movements are detected for long periods, and refusing or accepting a call when the wireless headsets are used in combination with a portable telephone so that the simple oscillation of the head upwards or downwards or to the right and to the left corresponds to a command sent to the main station.

That which is claimed:

1. A remote play device for an entertainment system, the remote play device comprising:
   an amplifier;
   at least one motion detection device configured to generate motions signals;
   a wireless communications device cooperating with said at least one motion detection device to send the motion signals to a remote device and to receive audio signals from the remote device, wherein the remote device is separate and remote from the remote play device, and wherein the audio signals received by the wireless communications device from the remote device comprise audio characteristics that have not been varied based upon the motion signals; and
   a processor configured to vary the audio characteristics of the audio signals played through said amplifier based upon said at least one motion detection device, the remote device being configured to adapt video characteristics of video signals, complementary to the audio signals, based on the motion signals.

2. The remote play device according to claim 1, wherein said processor is configured to turn off power to at least said amplifier based upon no motion being detected by said at least one motion detection device for a threshold time.

3. The remote play device according to claim 1, wherein said amplifier comprises a digital class D amplifier.

4. The remote play device according to claim 1, further comprising a battery configured to power at least said amplifier.

5. The remote play device according to claim 1, wherein said at least one motion detection device comprises a plurality of micro-electromechanical system (MEMS) linear accelerometers.

6. The remote play device according to claim 1, wherein said wireless communications device comprises at least one of a Bluetooth and a Wireless Local Area Network (WLAN) communication device.

7. The remote play device according to claim 1, further comprising a housing wearable by a head of a user and carrying said amplifier, at least one motion detection device, and processor.

8. The remote play device according to claim 1, further comprising at least one other processor coupled to said processor.

9. An application specific integrated circuit (ASIC) for a remote play device for an interactive entertainment system, the ASIC comprising:
   an integrated circuit (IC) substrate,
   an amplifier carried by said IC substrate;
   at least one motion detection device carried by said IC substrate and configured to generate motions signals;
   a wireless communications device carried by said IC substrate and cooperating with said at least one motion detection device to send the motion signals to a remote device and receive audio signals from the remote device, the remote device being separate from the remote play device and configured to vary multimedia characteristics, other than audio characteristics, based on the motion signals, wherein the audio signals received by the wireless communications device from the remote device comprise audio characteristics that have not been varied based upon the motion signals; and
   a processor carried by said IC substrate and configured to vary the audio characteristics of the audio signals played through said amplifier based upon said at least one motion detection device.

10. The ASIC according to claim 9, wherein said processor is configured to turn off power to at least said amplifier based upon no motion being detected by said at least one motion detection device for a threshold time.

11. The ASIC according to claim 9, wherein said amplifier comprises a digital class D amplifier.

12. The ASIC according to claim 9, wherein said at least one motion detection device comprises a plurality of micro-electromechanical system (MEMS) linear accelerometers.

13. The ASIC according to claim 9, wherein said wireless communications device comprises at least one of a Bluetooth and a Wireless Local Area Network (WLAN) communication device.

14. The ASIC according to claim 9, further comprising at least one other processor carried by said IC substrate and coupled to said processor.

15. A method for operating a remote play device for an entertainment system, the remote play device comprising an amplifier, at least one motion detection device, a wireless communications device, and a processor coupled to the amplifier, at least one motion detection device, and wireless communications device, the method comprising:
   using the wireless communications device in cooperation with the at least one motion detection device to send motion signals to a remote device and receive audio signals from the remote device, wherein the remote device is separate and remote from the remote play device, and wherein the audio signals received by the wireless communications device from the remote device comprise audio characteristics that have not been varied based upon the motion signals;
   using the processor to vary the audio characteristics of the audio signals played through the amplifier based upon the at least one motion detection device; and
   using the remote device to vary video characteristics of video signals, complementary to the audio signals, based on the motion signals.

16. The method according to claim 15, further comprising using the processor to turn off power to at least the amplifier based upon no motion being detected by the at least one motion detection device for a threshold time.

17. The method according to claim 15, wherein the amplifier comprises a digital class D amplifier.

18. The method according to claim 15, further comprising supplying power at least the amplifier via a battery.

19. The method according to claim 15, wherein the at least one motion detection device comprises a plurality of microelectromechanical system (MEMS) linear accelerometers.

20. The method according to claim 15, wherein the wireless communications device comprises at least one of a Bluetooth and a Wireless Local Area Network (WLAN) communication device.

21. The method according to claim 15, wherein the remote play device further comprises a housing wearable by a head of a user and carrying the amplifier, at least one motion detection device, and processor.

* * * * *